United States Patent [19]

Herzig

[11] Patent Number: 5,041,594
[45] Date of Patent: Aug. 20, 1991

[54] PROCESS FOR PREPARING ORGANO(POLY)SILOXANES HAVING SI-LINKED, CONJUGATED DIENYL GROUPS

[75] Inventor: Christian Herzig, Taching, Fed. Rep. of Germany

[73] Assignee: Wacker-Chemie GmbH, Munich, Fed. Rep. of Germany

[21] Appl. No.: 555,218

[22] Filed: Jul. 20, 1990

[30] Foreign Application Priority Data

Aug. 18, 1989 [DE] Fed. Rep. of Germany ....... 3927359

[51] Int. Cl.$^5$ ................................................ C07F 7/08
[52] U.S. Cl. ..................................... 556/450; 556/453; 556/454; 556/455; 556/456
[58] Field of Search ............... 556/450, 453, 454, 455, 556/456

[56] References Cited

U.S. PATENT DOCUMENTS 4,874,881 10/1989 Suzuki et al. ........................ 556/453
4,876,373 10/1989 Okawa et al. ........................ 556/453

*Primary Examiner*—Paul F. Shaver

[57] ABSTRACT

Organo(poly)siloxanes having Si-linked, conjugated dienyl groups are prepared by adding a secondary or tertiary acetylenic alcohol (1) to an organo(poly)siloxane (2) having at least one Si-linked hydrogen atom in the presence of a catalyst (3) which promotes the addition of Si-linked hydrogen to an aliphatic multiple bond, and then eliminating water by an intramolecular reaction in the presence of an acid catalyst (4) from the alkenol groups of the organo(poly)siloxane thus obtained.

4 Claims, No Drawings

PROCESS FOR PREPARING ORGANO(POLY)SILOXANES HAVING SI-LINKED, CONJUGATED DIENYL GROUPS

The present invention relates to organo(poly)siloxanes and more particularly to a process for preparing organo(poly)siloxanes having Si-linked, conjugated dienyl groups.

BACKGROUND OF THE INVENTION

Linear and cyclic organo(poly)siloxanes containing Si-linked butadienyl and 3-methylbutadienyl groups are described in German Auslegeschrift 1,210,846 and GB-A 1,081,150. They are prepared by adding vinylacetylene and isopropenylacetylene, respectively, to an organo(poly)siloxane having at least one Si-linked hydrogen atom in the presence of a catalyst which promotes the addition of Si-linked hydrogen to an aliphatic multiple bond. Vinylacetylene is gaseous, so that the reaction must be carried out under pressure, and it has a tendency to explode. The yields in the process are only moderate.

The addition of 3-methyl-1-butyn-3-ol to organosilicon compounds containing Si-linked hydrogen in the presence of hexachloroplatinic acid is described in U.S. Pat. No. 2,823,218 to Speier et al. It is also known from Chemical Abstracts 51, 9474f, 1957 that 2-triethylsilyl-3-methyl-1,3-butadiene can be obtained by elimination of water when 2-triethylsilyl-3-methyl-1-buten-3-ol is heated in the presence of $KHSO_4$.

It was expected from Chemical Abstracts 51, 9474f, 1957, that butadienyl-functional organo(poly)siloxanes would crosslink in the presence of acids which promote the cationic polymerization of the butadienyl groups.

Surprisingly, applicants have found that butadienyl-functional organo(poly)siloxanes can be prepared without crosslinking in the presence of acids.

It is, therefore, an object of the present invention to prepare organo(poly)siloxanes having Si-linked conjugated dienyl groups in a simple process, from readily available compounds and in good yields. A further object of the present invention is to prepare organo(poly)siloxanes having Si-linked, conjugated dienyl compounds without using pressure.

SUMMARY OF THE INVENTION

The foregoing objects and others which will become apparent from the following description are accomplished in accordance with this invention, generally speaking, by providing a process for preparing organo(poly)siloxanes having Si-linked, conjugated dienyl groups of the general formula $$Q_a R_b SiO_{\frac{4-(a+b)}{2}} \quad (I)$$

in which the R(s) are the same or different and represent a monovalent hydrocarbon radical and a monovalent halogenated hydrocarbon radical having from 1 to 18 carbon atoms(s) per radical, Q represents a radical of the formula $$-CH=CH-CR^1=CR^2R^3$$

and/or

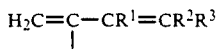

in which $R^1$ represents a hydrogen atom or a monovalent hydrocarbon radical having from 1 to 12 carbon atoms(s) per radical or a monovalent halogenated hydrocarbon radical having from 1 to 12 carbon atom(s) per radical and $R^2$ represents a hydrogen atom or a monovalent hydrocarbon radical having 1 to 12 carbon atom(s) per radical, or the two radicals $R^1$ and $R^2$ together represents a divalent hydrocarbon radical having from 3 to 5 carbon atoms per radical, $R^3$ represents a hydrogen atom or a monovalent hydrocarbon radical having from 1 to 4 carbon atom(s) per radical, with the proviso that $R^3$ is a hydrogen atom if the two radicals $R^1$ and $R^2$ together represent a divalent hydrocarbon radical having from 3 to 5 carbon atoms per radical, a is 0 or 1, with an average of from 0.003 to 1.0, b is 0, 1, 2 or 3, with an average of from 0.05 to 2.5, and the sum of a+b is an average which is not greater than 3, with the proviso that at least one radical Q is present per molecule, which comprises adding a secondary or tertiary acetylenic alcohol (1) of the general formula $$HC \equiv C-C(OH)R^1-CHR^2R^3,$$

in which $R^1$, $R^2$ and $R^3$ are the same as above, to an organo(poly)siloxane (2) which has at least one Si-linked hydrogen atom and has the general formula $$H_e R_f SiO_{\frac{4-(e+f)}{2}} \quad (III)$$

in which R is the same as above, e is 0 or 1, with an average of from 0.003 to 1.0, f is 0, 1, 2 or 3, with an average of from 0.05 to 2.5, and the sum of e+f is not greater than 3, in the presence of a catalyst (3) which promotes the addition of Si-linked hydrogen to an aliphatic multiple bond, and then eliminating water by an intramolecular reaction in the presence of an acid catalyst (4) from the alkenol groups of the organo(poly)siloxane thus obtained.

DESCRIPTION OF THE INVENTION

In the organo(poly)siloxanes represented by formulas (I) and (III) the R radical is a monovalent hydrocarbon radical or a halogenated monovalent hydrocarbon radical having from 1 to 18 carbon atoms per radical.

Examples of radicals represented by R are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl radical and the allyl radical; cycloalkyl radicals, such as cyclopentyl, cyclohexyl, cycloheptyl and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical, the α-phenylethyl radical and the β-phenylethyl radical. Preferred examples of radicals represented by R are the methyl radical and the phenyl radical.

Examples of halogenated radicals represented by R are halogenoalkyl radicals, such as the 3,3,3-trifluoro-n-propyl radical, the 2,2,2,2',2',2'-hexafluoroisopropyl radical, the heptafluoroisopropyl radical and halogenoaryl radicals, such as the o-, m- and p-chlorophenyl radical.

Examples of hydrocarbon radicals represented by $R^1$ are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical; aryl radicals, such as the phenyl radical; alkaryl radicals, such as o-, m- and p-tolyl radicals, xylyl radicals and ethylphenyl radicals; and aralkyl radicals, such as the benzyl radical.

Examples of halogenated hydrocarbon radicals represented by $R^1$ are halogenoalkyl radicals, such as the 1,1,1-trichloromethyl radical, the 3,3,3-trifluoro-n-propyl radical, the 2,2,2,2',2',2'-hexafluoroisopropyl radical and the heptafluoroisopropyl radical, and halogenoaryl radicals, such as the o-, m- and p-chlorophenyl radical.

The radical $R^1$ is preferably a methyl or phenyl radical, and more preferably a methyl radical.

Examples of hydrocarbon radicals represented by $R^2$ are alkyl radicals, such as the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, and dodecyl radicals, such as the n-dodecyl radical.

Examples of hydrocarbon radicals represented by $R^3$ are alkyl radicals, such as the methyl, ethyl, n-propyl, isopropyl, 1-n-butyl, 2-n-butyl, isobutyl and tert-butyl radical.

Examples of radicals in which the radicals $R^1$ and $R^2$ together represent a divalent hydrocarbon radical having from 3 to 5 carbon atoms are those of the formula $-(CH_2)_3-$, $-(CH_2)_4-$, $-CH(CH_3)-(CH_2)_3-$, $-CH_2-CH(CH_3)-(CH_2)_2-$ and $-(CH_2)_5-$, in which the $-(CH_2)_4-$ radical is preferred.

The radical $R^2$ is preferably a hydrogen atom or a methyl radical, and more preferably a hydrogen atom.

The radical $R^3$ is preferably a hydrogen atom.

In formula (I), a is preferably an average of from 0.03 to 1.0 and b is preferably an average of from 0.5 to 2.0.

The organo(poly)siloxanes of this invention having Si-linked, conjugated dienyl groups which are represented by formula I, include linear, branched and also cyclic organo(poly)siloxanes. The average molecular weight of the organo(poly)siloxanes of this invention is preferably from 200 to 1,000,000 g/mole, and more preferably from 300 to 50,000 g/mole. The average viscosity of the organo(poly)siloxanes of this invention is preferably at least 3 mm$^2$.s$^{-1}$ at 25° C., and more preferably from 3 to 1,000,000 mm$^2$.s$^{-1}$ at 25° C. The organo(poly)siloxanes of this invention can, however, also be solids.

Examples of the organo(poly)siloxanes prepared in accordance with this invention and having Si-linked, conjugated dienyl groups are those of the formula
ZMe$_2$SiOSiMe$_2$Z
ZMe$_2$SiO(SiMe$_2$O)$_{11}$SiMe$_2$Z
ZMe$_2$SiO(SiMe$_2$O)$_{64}$SiMe$_2$Z
Me$_3$SiOSiZMeOSiMe$_3$
Me$_3$SiO(SiZMeO)$_7$(SiMe$_2$O)$_{15}$SiMe$_3$
Me$_3$SiO(SiZMeO)$_5$(SiMe$_2$O)$_{200}$SiMe$_3$
ZMe$_2$SiO(SiZMeO)$_3$(SiMe$_2$O)$_{95}$SiMe$_2$Z
(SiZMeO)$_4$

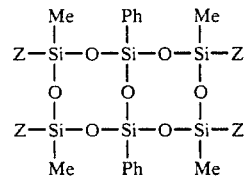

YMe$_2$SiOSiMe$_2$Y
YMe$_2$SiO(SiMe$_2$O)$_6$SiMe$_2$Y
Me$_3$SiO(SiYMeO)$_7$(SiMe$_2$O)$_{15}$SiMe$_3$
XMe$_2$SiO(SiMe$_2$O)$_{11}$SiMe$_2$X
(SiVMeO)$_4$
in which Me represents a methyl radical, Ph represents a phenyl radical, Z represents a radical of the formula $$-CH=CH-C(CH_3)=CH_2$$

and/or $$H_2C=C-C(CH_3)=CH_2$$
$$|$$

Y represents a radical of the formula $$-CH=CH-CH=CH_2 \text{ and/or } H_2C=C-CH=CH_2$$
$$|$$

X represents a radical of the formula $$-CH=CH-C(CH_3)=CH-CH_3$$

and/or $$H_2C=C-C(CH_3)=CH-CH_3$$
$$|$$

and V represents a radical of the formula

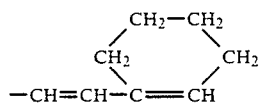

and/or

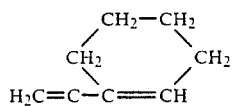

Preferred organo(poly)siloxanes having Si-linked, conjugated dienyl groups are those of the general formula $$Q_dR_{3-d}SiO(SiR_2O)_n(SiRQO)_mSiR_{3-d}Q_d \qquad (II)$$

in which R and Q are the same as above, d is 0 or 1; n is 0 or an integer of from 1 to 1500; and m is 0 or an integer of from 1 to 200, with the proviso that at least one radical Q is present per molecule and the ratio of n:m is not greater than 200.

Examples of secondary and tertiary acetylenic alcohols (1) which are employed in the process of this invention are 2-methyl-3-butyn-2-ol, 3-butyn-2-ol, 3-methyl-4-pentyn-3-ol, 4-pentyn-3-ol, 1-ethynylcyclohexan-1-ol, 3-ethyl-4-pentyn-3-ol, 2-phenyl-3-butyn-2-ol, 1-ethynylcyclopentan-1-ol and 3-phenyl-4-pentyn-3-ol. The preferred acetylenic alcohols are 2-methyl-3-butyn-2-ol, 3-methyl-4-pentyn-3-ol and 1-ethynylcyclohexan-1-ol with 2-methyl-3-butyn-2-ol being the preferred acetylenic alcohol.

Processes for preparing acetylenic alcohols (1) are known to those skilled in the art. Acetylenic alcohols (1) are obtained, for example, by the Reppe process from actylene and carbonyl compounds in accordance with the following equation:

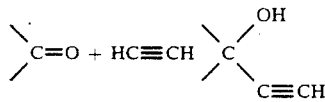

In the process of this invention it is also possible to use, as organo(poly)siloxanes (2) having at least one Si-linked hydrogen atom, the same linear, branched or cyclic organo(poly)siloxanes having at least one Si-linked hydrogen atom which has been or could have been employed heretofore in the addition of compounds containing an aliphatic multiple bond to organo(poly)siloxanes containing Si-linked hydrogen in the presence of catalysts which promote the addition of Si-linked hydrogen to an aliphatic multiple bond.

Cyclic organo(poly)siloxanes, as well as linear and branched organo(poly)siloxanes, are present in the organo(poly)siloxanes (2) which are represented by Formula (III). The organo(poly)siloxanes (2) preferably contain from 0.04 to 1.6 percent by weight, and more preferably from 0.1 to 1.0 percent by weight, of Si-linked hydrogen. The average viscosity of the organo(poly)siloxanes (2) is preferably from 0.5 to 500,000 mPa.s, and more preferably from 1.0 to 10,000 mPa.s.

Examples of organo(poly)siloxanes (2) having at least one Si-linked hydrogen, which are preferably employed in this invention are those of the general formula $$H_dR_{3-d}SiO(SiR_2O)_o(SiRHO)_pSiR_{3-d}H_d \qquad (IV)$$

in which R and d are the same as above, o is 0 or an integer of from 1 to 1500 and p is 0 or an integer of from 1 to 200, with the proviso that the ratio o:p is not greater than 200. Methyl or phenyl radicals are particularly preferred as radicals represented by R in the above formula.

Examples of organo(poly)siloxanes (2) are copolymers formed from dimethylhydrogensiloxane and dimethylsiloxane units, copolymers formed from dimethylhydrogensiloxane, dimethylsiloxane and methylhydrogensiloxane units, copolymers formed from trimethylsiloxane and methylhydrogensiloxane units, copolymers formed from trimethylsiloxane, dimethylsiloxane and methylhydrogensiloxane units, copolymers formed from dimethylhydrogensiloxane, dimethylsiloxane and phenylmethylsiloxane units, cyclic methylhydrogenpolysiloxanes, copolymers formed from dimethylhydrogensiloxane and methylsiloxane units and copolymers formed from dimethylhydrogensiloxane and phenylsiloxane units.

Processes for the preparation of organo(poly)siloxanes (2), including those of the preferred type, are generally known.

The acetylenic alcohol (1) is preferably employed in the process of this invention in an amount such that 0.9 to 3.0 moles, and more preferably from 1.05 to 1.10 moles, of acetylenic alcohol (1) are present per gram atom of Si-linked hydrogen in the organo(poly)siloxane (2).

Examples of catalysts (3) which may be employed to promote the addition of Si-linked hydrogen to an aliphatic multiple bond, in the process of this invention, are the same catalysts which have been or could have been employed heretofore for promoting the addition of Si-linked hydrogen to an aliphatic multiple bond. The catalysts (3) are preferably a metal from the group of platinum metals or a compound or complex from the group of platinum metals. Examples of such catalysts are metallic and finely dispersed platinum, which can be supported on a finely divided carrier, such as silicon dioxide, aluminum oxide or active charcoal, compounds or complexes of platinum, such as platinum halides, for example $PtCl_4$, $H_2PtCl_6.6H_2O$, $Na_2PtCl_4.H_2O$, platinum/olefin complexes, platinum/alcohol complexes, platinum/alcoholate complexes, platinum/ether complexes, platinum/aldehyde complexes, platinum/ketone complexes, including reaction products formed from $H_2PtCl_6.6H_2O$ and cyclohexanone, platinum/vinylsiloxane complexes, such as platinum/1,3-divinyl-1,1,3,3-tetramethyldisiloxane complexes with or without a detectable amount of inorganically linked halogen, bis-(gamma-picoline)-platinum dichloride, trimethylene dipyridineplatinum dichloride, dicyclopentadieneplatinum dichloride, dimethylsulfoxide ethylene platinum-(II) dichloride and reaction products of platinum tetrachloride with an olefin and a primary amine or a secondary amine or a primary and a secondary amine as disclosed in U.S. Pat. No. 4,292,434, such as the reaction product formed from platinum tetrachloride dissolved in 1-octene with sec-butylamine, or ammonium/platinum complexes as specified in EP-B 110,370.

The catalyst (3) is preferably employed in an amount of from 0.5 to 100 ppm by weight (parts by weight per million parts by weight), and more preferably in amounts of from 1 to 20 ppm by weight, calculated as elementary platinum and based on the total weight of acetylenic alcohol (1) and organo(poly)siloxane (2) having at least one Si-linked hydrogen atom.

The addition reaction (or hydrosilylation reaction) is preferably carried out at the pressure of the ambient atmosphere, that is to say at about 1020 hPa (abs.), but can also be carried out at higher or lower pressures. The addition reaction is also preferably carried out at a temperature of from 70° C. to 150° C., and more preferably from 100° C. to 120° C.

A mixture of isomers as shown in the following equation is formed in the hydrosilylation reaction:

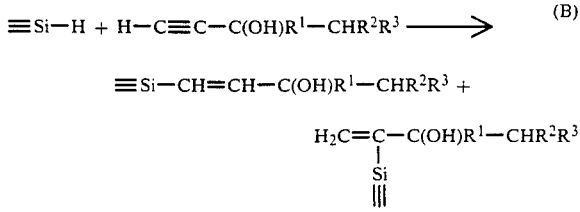 (B)

The organo(poly)siloxanes obtained after the hydrosilylation reaction thus contain Si-linked alkenol groups of the formula

and/or

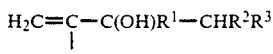

Excess acetylenic alcohol (1) is removed by distillation from the organo(poly)siloxane obtained after the hydrosilylation reaction.

Water is eliminated by an intramolecular reaction from the alkenol groups in the presence of an acid catalyst after the hydrosilylation reaction, in accordance with the following equation:

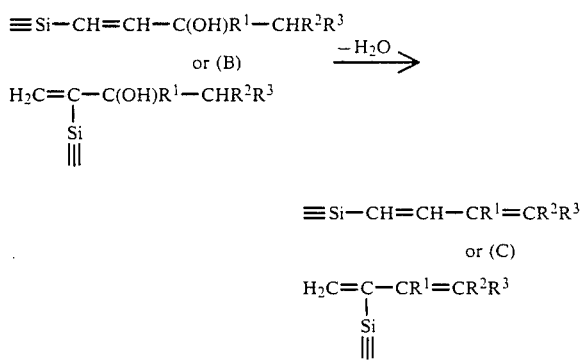

Examples of acid catalysts (4) which are added to the process of this invention are p-toluenesulfonic acid, trifluoromethanesulfonic acid, trichloroacetic acid, fumaric acid, sulfuric acid, perchloric acid, phosphoric acid, hexafluorophosphoric acid and strongly acidic ion exchangers and clays. Acid catalysts are preferably employed in an amount of from 1 to 5000 ppm by weight, and more preferably from 10 to 1000 ppm by weight, based on the total weight of organo(poly)siloxane (2) and acetylenic alcohol (1) employed.

The elimination of water is preferably carried out under the pressure of the ambient atmosphere, that is, at about 1020 hPa (abs.), but can also be carried out at higher or lower pressures. The elimination of water is also preferably carried out at a temperature of from 60° C. to 140° C., and more preferably from 80° C. to 120° C.

Inert, water-immiscible solvents are preferably used in the process of this invention in the elimination of water from the alkenol groups. Examples of inert, water-immiscible solvents are mixtures of xylene isomers, toluene and cyclohexane. The inert, water-immiscible solvent is preferably used in an amount of from 10 to 40 percent by weight, based on the weight of organo(poly)siloxanes (B) containing alkenol groups. The organic solvent serves not only as a homogenizing medium, but also serves to facilitate the removal of the water of reaction formed in the process according to this invention. In the process, it is preferred that the water of reaction be removed by azeotropic distillation in order to separate the aqueous phase from the condensed azeotrope and to recycle the inert organic solvent to the reaction mixture. The inert organic solvent is then removed by distillation from the organo(poly)siloxanes having Si-linked, conjugated dienyl groups.

In order to prevent crosslinking of the organo-(poly)siloxanes prepared in accordance with this invention by free-radical polymerization of the conjugated dienyl groups, it is preferred that inhibitors be added, such as methoxyphenol, 2,6-di-tert-butyl-4-methylphenol, hydroquinone, phenothiazine, 4-hydroxymethyl-2,6-di-tert-butylphenol or 4,4-methylene-bis-2,6-di-tert-butylphenol, in the elimination of water from the alkenol groups in the process of this invention.

If appropriate, the organo(poly)siloxanes having Si-linked, conjugated dienyl groups prepared by the process of this invention are equilibrated with an organo(poly)siloxane (5).

Organo(poly)siloxanes (5) which are preferably employed are those selected from the group consisting of linear organo(poly)siloxanes, having terminal triorganosiloxy groups, of the formula

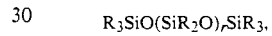

in which R is the same as above and r is 0 or an integer having a value of from 1 to 1500, linear organo(poly)siloxanes, having terminal hydroxyl groups, of the formula

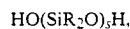

in which R is the same as above and s is an integer having a value of from 1 to 1500, cyclic organo(poly)siloxanes of the formula

in which R is the same as above and t is an integer of from 3 to 12, and copolymers formed from units of the formula

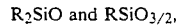

in which R is the same as above.

The ratio between the amount of the organo(poly)siloxanes employed in the equilibration is determined solely by the desired proportion of conjugated dienyl groups in the organo(poly)siloxanes produced as a result of the equilibration and by the desired average chain length.

In the equilibration, it is preferred that basic and acid catalysts be employed which promote the equilibration. Examples of basic catalysts are alkali metal hydroxides, such as sodium hydroxide and potassium hydroxide, trimethylbenzylammonium hydroxide and tetramethylammonium hydroxide. Alkali metal hydroxides are preferred. It is preferred to use alkali metal hydroxides in an amount of from 50 to 10,000 ppm (part per million) by weight, and more preferably from 500 to 2000 ppm by weight, based on the total weight of the organo(poly)siloxanes employed. Examples of acid catalysts are sulfuric acid, phosphoric acid, trifluoromethanesulfonic acid, phosphorus nitride chlorides and acid catalysts which are solid under the reaction conditions, such as acid-activated bleaching earth, acid zeolites, sulfonated coal and sulfonated styrene/divinylbenzene copolymer. Phosphorus nitride chlorides are preferred. Phosphorus nitride chlorides are preferably used in an amount of from 5 to 1000 ppm (parts per million) by weight, preferably from 50 to 200 ppm by weight, based on the total weight of the organo(poly)-siloxanes employed.

The equilibration which may be carried out is preferably carried out at 80° C. to 150° C. and at the pressure of the ambient atmosphere, that is at about 1020 hPa (abs.). If desired, however, it is also possible to use higher or lower pressures. The equilibration is preferably carried out in a 5 to 20 percent by weight, based on the total weight of the organo(poly)siloxanes employed, of a water-immiscible solvent, such as toluene. The catalyst can be deactivated before the mixture obtained in the equilibration is subjected to further treatment, such as distillation or filtration.

The process according to the invention can be carried out batchwise, or semi-continuously or continuously.

The organo(poly)siloxanes prepared in accordance with the invention are polymerizable or crosslinkable via the conjugated dienyl group by a free radical or cationic mechanism and can be vulcanized in accordance with known processes by means of elementary sulfur or sulfur-containing compounds. The organo(poly)siloxanes having Si-linked, conjugated dienyl groups prepared in accordance with this invention can be used generally as diene reactants in Diels-Alder reactions, as crosslinkable silicone rubber compositions, for homopolymerization and copolymerization with organic monomers containing one or more unsaturated carbon-carbon bonds, in the preparation of siloxane block copolymers and crosslinked, siloxane-containing copolymers and for the preparation of phase-separating copolymers.

EXAMPLE 1

About 75 mg of platinum tetrachloride, dissolved in 1-octene and containing 3 mg of platinum, calculated as the element, are stirred into 92.5 g (1.1 mol) of 2-methyl-3-butin-2-ol. About 455 g of a dimethylpolysiloxane containing one Si-linked hydrogen atom in each of the terminal units and having the average composition $H(CH_3)_2SiO[Si(CH_3)_2O]_{10.5}Si(CH_3)_2H$ are added dropwise to this mixture at 100° C. and under an atmosphere of nitrogen. After a reaction time of about 6 hours at 100° C., 97 percent of the Si-linked hydrogen have reacted. The constituents which are volatile at 100° C. and at 5 hPa (abs.) and excess 2-methyl-3-butyn-2-ol are then removed by distillation. This gives 500 g of a dimethylpolysiloxane having terminal, Si-linked alkenol groups of the formula

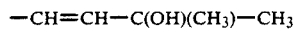

and

The $^1$H-NMR spectrum shows that the ratio of isomers for the above alkenol groups is 65:35. The dimethylpolysiloxane having terminal, Si-linked alkenol groups is a yellowish oil having a viscosity of 47 mm$^2$.s$^{-1}$ at 25° C. Water is eliminated from the alkenol groups at 80° C. to 90° C. by adding 2 g of p-toluenesulfonic acid, 40 mg of methoxyphenol and 500 ml of cyclohexane, and is removed azeotropically. The solution is then filtered with the addition of clay and a little sodium carbonate, and the cyclohexane is removed by vacuum distillation. About 470 g of a yellowish oil having a viscosity of 15 mm$^2$.s$^{-1}$ at 25° C. are obtained. The $^1$H-NMR spectrum shows that the dimethylpolysiloxane containing terminal, Si-linked, conjugated dienyl groups, of the formula

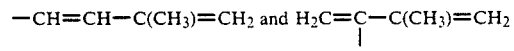

is a mixture of isomers in which the ratio of the conjugated dienyl groups is analogous to that of the alkenol groups, and indicates a conversion of 95 percent of the alkenol groups. The IR spectrum exhibits the stretching vibrations of the terminal double bonds in the conjugated diene groups at 1579 cm$^{-1}$ and 1615 cm$^{-1}$.

EXAMPLE 2

The procedure of Example 1 is repeated, except that 108 g of 3-methyl-4-pentin-3-ol are used instead of 92.5 g of 2-methyl-3-butin-2-ol. About 510 g of a dimethylpolysiloxane having terminal, Si-linked, isomeric alkenol groups of the formula

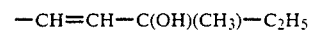

and

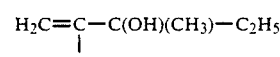

are obtained. The conversion of the alkenol groups into the conjugated diene groups is affected in the same manner as in Example 1. The conversion is 90 percent. A dimethylpolysiloxane having terminal, Si-linked, conjugated dienyl groups of the following formula is obtained, the proportion of the various isomers being indicated by the $^1$H-NMR spectrum:

| | |
|---|---|
| 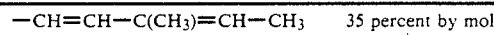 | 35 percent by mol |
| 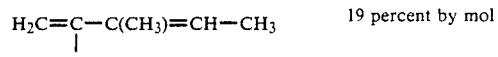 | 19 percent by mol |
|  | 30 percent by mol |
|  | 16 percent by mol |

The IR spectrum exhibits several bands for the terminal bonds in the conjugated dienyl groups between 1570 cm$^{-1}$ and 1630 cm$^{-1}$.

EXAMPLE 3

About 75 mg of platinum tetrachloride dissolved in 1-octene and containing 3 mg of platinum, calculated as the element, are stirred into 92.5 g (1.1 mol) of 2-methyl-3-butin-2-ol. About 182 g of a copolymer composed of methylhydrogensiloxane units, dimethylsiloxane units and trimethylsiloxane units, having a viscosity of 11.2 mm$^2$.s$^{-1}$ at 25° C. and containing 0.55 percent by weight of Si-linked hydrogen, are added dropwise to this mixture at 100° C. over a period of 2 hours under an atmosphere of nitrogen. After a reaction time of about 2 hours at 100° C., 97 percent of the Si-linked hydrogen have reacted. The constituents volatile at 100° C. and at 5 hPa (abs.) are then removed by distillation. A clear oil having a viscosity of 1945 mm$^2$.s$^{-1}$ at 25° C. is obtained. The $^1$H-NMR spectrum for the copolymer, which contains laterally attached, Si-linked alkenol groups of the formula

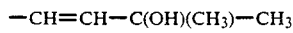
—CH=CH—C(OH)(CH$_3$)—CH$_3$ and

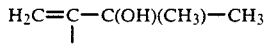
H$_2$C=C—C(OH)(CH$_3$)—CH$_3$
　　| shows a ratio of isomers of 69:31 for the above alkenol groups. Water is eliminated from the alkenol groups under reflux conditions by adding 2 g of p-toluenesulfonic acid, 20 mg of methoxyphenol and 250 ml of cyclohexane, and then removed by azeotropic distillation. After 20 hours, 1 g of anhydrous sodium carbonate is added to the reaction mixture, and the solution is filtered. The cyclohexane is then removed by distillation. This gives about 180 g of a dimethylpolysiloxane containing an average of 8 Si-linked, isomeric, conjugated dienyl groups of the formula

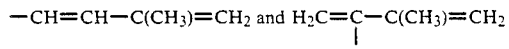
—CH=CH—C(CH$_3$)=CH$_2$ and H$_2$C=C—C(CH$_3$)=CH$_2$
　　　　　　　　　　　　　　　　　　　　　　　　| per molecule and having a viscosity of 72 mm$^2$.s$^{-1}$ at 25° C. The $^1$H-NMR spectrum indicates a conversion of 97 percent, based on the alkenol groups. The IR spectrum exhibits the stretching vibrations for the terminal double bonds in the conjugated dienyl groups at 1580 cm$^{-1}$ and 1618 cm$^{-1}$.

EXAMPLE 4

About 75 mg of platinum tetrachloride dissolved in 1-octene and containing 3 mg of platinum, calculated as the element, are stirred into 92.5 g (1.1 mol) of 2-methyl-3-butyn-2-ol. About 752 g of a copolymer formed from dimethylhydrogensiloxane, methylhydrogensiloxane and dimethylsiloxane units, having a viscosity of 91 mm$^2$.s$^{-1}$ at 25° C. and containing 0.133 percent by weight (1.00 equivalent) of Si-linked hydrogen are added dropwise to this mixture at 100° C. under an atmosphere of nitrogen. After a reaction time of about 5 hours at 120° C., 98 percent of the Si-linked hydrogen in the copolymer have reacted. The constituents volatile at 100° C. and at 15 hPa (abs.) are then removed by distillation. This gives 817 g of a dimethylpolysiloxane having terminal and laterally-attached, Si-linked alkenol groups of the formula

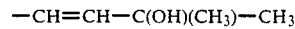
—CH=CH—C(OH)(CH$_3$)—CH$_3$ and

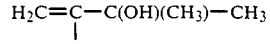
H$_2$C=C—C(OH)(CH$_3$)—CH$_3$
　　|

Water is eliminated from the alkenol groups under reflux conditions by adding 4 g of p-toluenesulfonic acid, 60 mg of methoxyphenol and 700 ml of cyclohexane. A total of about 18 ml of water are removed by azeotropic distillation. About 1 percent of clay and 2 g of sodium carbonate are then added to the solution, then filtered and the cyclohexane is removed by distillation. Approximately 790 g of a clear, yellowish oil having a viscosity of 195 mm$^2$.s$^{-1}$ at 25° C. are obtained. The $^1$H-NMR spectrum indicates that the dimethylpolysiloxane, which contains terminal and laterally-attached, Si-linked, conjugated dienyl groups of the formula

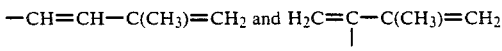
—CH=CH—C(CH$_3$)=CH$_2$ and H$_2$C=C—C(CH$_3$)=CH$_2$
　　　　　　　　　　　　　　　　　　　　　　　| has an isomeric ratio of 65:35 for the above conjugated dienyl groups.

EXAMPLE 5

About 6.6 mg of platinum, calculated as the element, in the form of a 1 percent solution of H$_2$PtCl$_6$.3H$_2$O in isopropanol, are stirred into 370 g of 2-methyl-3-butin-2-ol. A mixture containing 268 g of 1,1,3,3-tetramethyldisiloxane and 6.6 mg of platinum, calculated as the element, in the form of a 1 percent solution of H$_2$PtCl$_6$.3H$_2$O in isopropanol, are added dropwise to this mixture at 100° C. under an atmosphere of nitrogen, in which the temperature must not exceed 115° C. After a reaction time of approximately 5 hours, 99 percent of the Si-linked hydrogen in the 1,1,3,3-tetramethyldisiloxane have reacted. The constituents volatile at 80° C. and at 15 hPa (abs.) are then removed by distillation. About 572 g (95 percent of theory) of a disiloxane having a viscosity of 150 mm$^2$.s$^{-1}$ at 25° C. and containing terminal, Si-linked alkenol groups of the formula

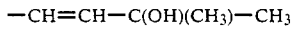
—CH=CH—C(OH)(CH$_3$)—CH$_3$ and

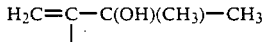
H$_2$C=C—C(OH)(CH$_3$)—CH$_3$
　　| are obtained. The $^1$H-NMR spectrum indicates an isomeric ratio of 71:29 for the above alkenol groups. Water is eliminated from the alkenol groups under reflux conditions by adding 600 ml of cyclohexane, 4 g of toluene sulfonic acid and 50 ppm by weight of methoxyphenol. A total of about 66 ml of water is removed by azeotropic distillation. The solution is purified by adding 12 g of clay and 2 g of sodium carbonate and then filtered, and the cyclohexane is removed by distillation. This gives 480 g of a disiloxane having terminal, Si-linked, conjugated dienyl groups of the formula

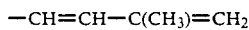
—CH=CH—C(CH$_3$)=CH$_2$ and

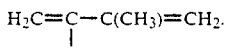
H$_2$C=C—C(CH$_3$)=CH$_2$.
　　|

The $^1$H-NMR spectrum shows that the disiloxane is an isomeric mixture of the conjugated dienyl groups which are analogous to those of the alkenol groups. A colorless product having a viscosity of 2.3 mm$^2$.s$^{-1}$ at 25° C. can be obtained by vacuum distillation.

EXAMPLE 6

About 26 g of the product from Example 1 are equilibrated for 16 hours at 140° C. with 208 g of decamethylcyclopentasiloxane, 50 ppm by weight of methoxyphenol and 1000 ppm by weight of KOH (in a 40 percent solution in methanol). After 0.5 g of glacial acetic acid is added, the solution is cooled and clay is added, and the mixture is filtered. The constituents volatile at 100° C. and at 10 hPa (abs.) are then removed by distillation. A colorless oil having a viscosity of 420 mm$^2$.s$^{-1}$ at 25° C. is isolated. The oil thus obtained is a dimethylpolysiloxane having terminal, Si-linked, conjugated dienyl groups of the formula $$-CH=CH-C(CH_3)=CH_2$$

and $$H_2C=C-C(CH_3)=CH_2.$$
$$\phantom{H_2C=C}|$$

What is claimed is:

1. A process for preparing organo(poly)siloxanes having Si-linked, conjugated dienyl groups of the formula $$Q_aR_bSiO_{\frac{4-(a+b)}{2}} \qquad (I)$$

in which R is selected from the group consisting of a monovalent hydrocarbon radical and a monovalent halogenated hydrocarbon radical having from 1 to 18 carbon atom(s) per radical, Q is a radical selected from the group consisting of the formulas $$-CH=CH-CR^1=CR^2R^3, \ H_2C=C-CR^1=CR^2R^3$$
$$\phantom{-CH=CH-CR^1=CR^2R^3, \ H_2C=C}|$$

and mixtures thereof, in which R$^1$ is selected from the group consisting of a hydrogen atom, a monovalent hydrocarbon radical and a monovalent halogenated hydrocarbon radical having from 1 to 12 carbon atom(s) per radical and R$^2$ is selected from the group consisting of a hydrogen atom, a monovalent hydrocarbon radical having from 1 to 12 carbon atom(s) per radical, and the radicals R$^1$ and R$^2$ together represent a divalent hydrocarbon radical having from 3 to 5 carbon atoms per radical, R$^3$ is selected from the group consisting of a hydrogen atom and a monovalent hydrocarbon radical having from 1 to 4 carbon atom(s) per radical, with the proviso that R$^3$ is a hydrogen atom if R$^1$ and R$^2$ together represent a divalent hydrocarbon radical having from 3 to 5 carbon atoms per radical, a is 0 or 1, with an average of from 0.003 to 1.0, b is 0, 1, 2 or 3, with an average of from 0.05 to 2.5, and the sum of a+b is an average which is not greater than 3, and with a further proviso that at least one radical Q is present per molecule, which comprises adding an acetylenic alcohol (1) selected from the group consisting of a secondary acetylenic alcohol and a tertiary acetylenic alcohol of the formula $$H\equiv C-C(OH)R^1-CHR^2R^3,$$

in which R$^1$, R$^2$ and R$^3$ are the same as above, to an organo(poly)siloxane (2) which has at least one Si-linked hydrogen atom and has the formula $$H_eR_fSiO_{\frac{4-(e+f)}{2}}$$

in which R is the same as above, e is 0 or 1, with an average of from 0.003 to 1.0, f is 0, 1, 2 or 3, with an average of from 0.05 to 2.5, and the sum of e+f is not greater than 3, in the presence of a catalyst (3) which promotes the addition of Si-linked hydrogen to an aliphatic multiple bond, and thereafter eliminating water by an intramolecular reaction in the presence of an acid catalyst (4) from the alkenol groups of the organo(poly)siloxane thus obtained.

2. The process of claim 1, wherein the acetylenic alcohol (1) is 2-methyl-3-butyn-2-ol.

3. The process of claim 1, wherein the resulting organo(poly)siloxane having Si-linked, conjugated dienyl groups is equilibrated with an organo(poly)siloxane (5) selected from the group consisting of linear organo(poly)-siloxanes having terminal triorganosiloxy groups, linear organo(poly)siloxanes having terminal hydroxyl groups, cyclic organo(poly)siloxanes and copolymers formed from diorganosiloxane and monoorganosiloxane units.

4. The process of claim 2, wherein the resulting organo(poly)siloxane having Si-linked, conjugated dienyl groups is equilibrated with an organo(poly)siloxane (5) selected from the group consisting of linear organo(poly)siloxanes having terminal triorganosiloxy groups, linear organo(poly)siloxanes having terminal hydroxyl groups, cyclic organo(poly)siloxanes and copolymers formed from diorganosiloxane and monoorgano iloxane units.

* * * * *